Figure 1:
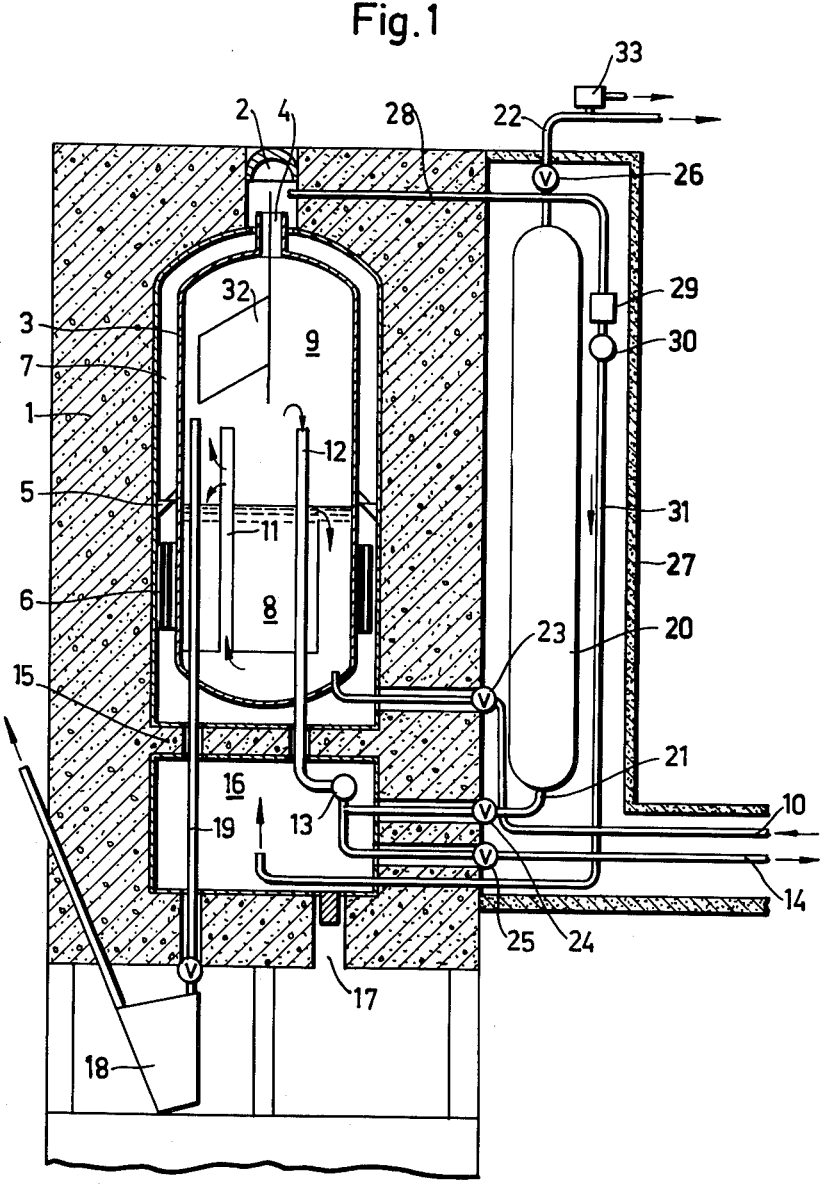

Sept. 7, 1965        P. H. E. MARGEN        3,205,145
NUCLEAR REACTOR

Filed June 6, 1963            2 Sheets-Sheet 1

Inventor
Peter H. E. Margen
by Pierce, Scheffler & Parker
atty's

Sept. 7, 1965　　P. H. E. MARGEN　　3,205,145
NUCLEAR REACTOR
Filed June 6, 1963　　2 Sheets-Sheet 2

Inventor
Peter H. E Margen
by Pierce, Scheffler + Parker
attys 3,205,145
NUCLEAR REACTOR
Peter H. E. Margen, Nasbypark, Sweden, assignor to Aktiebolaget Atomenergi, Stockholm, Sweden, a company of Sweden
Filed June 6, 1963, Ser. No. 286,111
Claims priority, application Sweden, June 6, 1962, 6,368/62
5 Claims. (Cl. 176—53)

The invention relates to a nuclear reactor comprising a comparatively thin-walled reactor tank containing a water space and a steam space above the water space. The reactor can be a pressurized water reactor, but the invention is particularly concerned with a reactor of the boiling water type, i.e. a reactor with boiling light or heavy water as cooling medium and with a steam space above the water, from where steam is led to its place of utilization, e.g. a heat exchanger or a turbine. The general purpose of the invention is to make it possible for the reactor vessel to be comparatively thin-walled, as it does not have to take up the full working pressure.

A nuclear reactor is known having a comparatively thin-walled reactor vessel which is enclosed in a pressure-containing chamber, e.g. a rock excavation or a pre-stressed concrete vessel, where the space between the reactor vessel and the pressure-container is filled with a gas, at the same pressure that prevails inside the reactor vessel, which is connected to the said gas space. In a known nuclear reactor of this type, having a gas, such as carbon dioxide, as cooling agent, this gas is preferably used to maintain the pressure between the reactor vessel and the pressure-resistant vessel. In a water-cooled reactor, however, it is important that steam is not admitted into the space between the reactor tank and the pressure-resistant vessel. It is also important that the gas in said space is not admitted into the reactor tank. Therefore, it is a special purpose of the invention to keep the steam and the gas separated, while simultaneously allowing the steam space and the gas space to be in an entirely open communication with each other.

The nuclear reactor of the invention comprises a comparatively thin-walled reactor tank, a water space in said reactor tank, a steam space in said reactor tank, a pressure-resistant vessel enclosing said reactor tank, a gas-filled space between the reactor tank and the pressure-resistant vessel, a communication between the steam space and the gas-filled space so as to equalize the pressures in said two spaces, means for withdrawing gas from said communication, means for removing any steam contained in said withdrawn gas, and means for supplying said dried gas to the gas-filled space.

The steam can be suitably removed by cooling the gas mixture so that the water condenses out, while the gas, which can be, for example, helium, remains uncondensed. The water vapour can be removed in another manner, e.g. the steam-gas mixture can be led through a drying medium. How effective the removal of water vapour needs to be has to be decided from case to case and depends on how much water vapour can be tolerated in the gas-filled space.

The invention is further explained as follows with reference to the attached drawing which schematically shows a design of a heavy water reactor as per the invention. The reactor consists of a pressure vessel 1 of pre-stressed concrete, provided with an opening at the top which is closed by a lid 2. The inside of the pressure vessel is clad with a sealing layer of carbon steel. The pressure vessel contains a comparatively thin-walled reactor tank 3 of stainless steel. This tank is provided with an opening 4 at the top through which the reactor vessel is in open communication with the space 7 between the reactor vessel and the pressure vessel. This space is filled with a gas which does not condense at normal temperatures and which is at the same pressure as the steam pressure in the reactor vessel. The space 7 contains means 5 for supporting the reactor tank in the pressure vessel. Space 7 also contains a thermal shield that consists of several cylinders 6 of carbon steel sheet metal.

Feed water enters the bottom of the reactor vessel through a pipe 10 and, after mixing with recirculating water, flows upward through tubes 11 in the reactor core 8. During its flow upward through tubes 11, boiling takes place. The steam flows downward through tubes 12 which pass through the reactor core and, in doing so, gets superheated. The superheated steam is collected in a header 13 and is taken out from there through a pipe 14 to its place of utilization, e.g. a turbine. The header 13 is arranged in a space 16 which is separated from the reactor vessel by a concrete wall 15 which acts as a radiation shield, so that it is possible to enter the space 16 through a manhole 17 after shut-down of the reactor, for inspection of the header, etc.

The removal of used fuel elements from and the loading of new fuel elements into the reactor vessel is carried out with the help of a loading machine 18 which is arranged under the pressure vessel and which is connected to the reactor vessel through a pipe 19. In the reactor vessel the fuel element is handled with the help of a manipulater 32 which is taken in and out of the reactor through the opening in the top of the reactor vessel and the pressure vessel.

Outside the pressure vessel is arranged an expansion chamber 20 which is connected to the header 13 for superheated steam through a pipe 21. The expansion chamber 20 is connected through a pipe 22 to a water-vessel which is not shown. In the pipe 22 is fitted a safety valve 26 which is arranged to open at a pre-set pressure. The expansion chamber 20 and pipes 10 and 14 for feed water and superheated steam are arranged in a concrete culvert 27 which is connected to a chimney which is not shown.

In the pipe 21 is fitted a safety valve 24. This is arranged to open automatically when the reactor operational conditions deviate from those normally permitted. The valve 24 is controlled therefore by a mechanism which is sensitive to such variations from the normal operational condition inside the pressure vessel. This mechanism can be arranged to sense an abnormal increase in temperature or pressure.

The pipe 10 for feed water contains a quick-closing valve 23 and pipe 14 for superheated steam is fitted with a similar quick-closing valve 25. Both these valves are arranged to close automatically when the reactor operational conditions deviate from those normally permitted, e.g. if there is a pipe rupture outside the pressure vessel or an increase of pressure inside it. These are controlled, for instance, by pressure or temperature increase inside the pressure vessel, by decrease in pressure in the feed water pipe or the steam pipe outside the pressure vessel or by increase in pressure in the culvert 27.

The valves 23, 24 and 25 are fitted in the culvert 27 outside the pressure vessel but as close to it as possible.

The steam in the steam space 9 of the reactor vessel is in contact with the non-condensible gas in the space 7 in the region above the opening 4 of the reactor vessel. To prevent the non-condensible gas from entering the reactor vessel and the steam from coming out into the space 7, a pipe 28 is fitted that leads off from above the opening 4. A steam-gas mixture is drawn out through this pipe and taken to a condenser 29, where the gas mixture is cooled so that the water condenses out. The dry gas is taken via a pump 30 and a pipe 31 into the bottom portion 16 of the pressure vessel and flows upward in the space 7, between the sheet metal cylinders that form the thermal shield.

Figure 2:
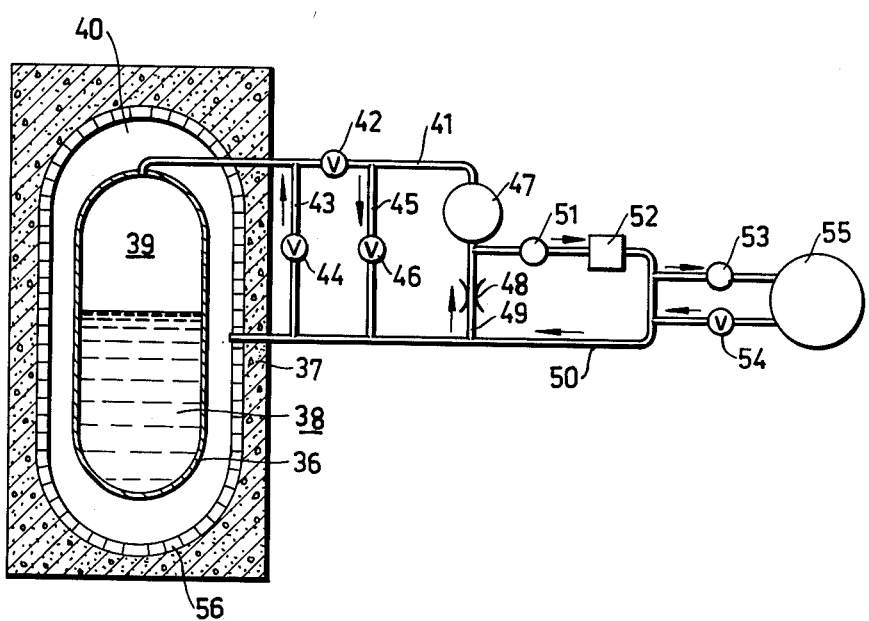

FIG. 2 illustrates the principles of a modified way of obtaining pressure equalization in a nuclear reactor which contains $D_2O$ as coolant and moderator. A pre-stressed concrete vessel 37 contains a thin-walled reactor tank 36 of stainless steel. The water space of the reactor tank is indicated 39 and the steam space is indicated 38. The concrete vessel has on its inner surface blocks 56 of insulating concrete. The concrete vessel also contains water pipes (not shown) through which cooling water is circulated.

A pipe connection 41 connects the steam space 39 within the reactor tank to a gas filled space 40 between the reactor tank and the concrete vessel. The pipe connection contains a small storage vessel 47 and a narrow passage 48. This narrow passage is shunted by a circuit containing a circulator 51 and a drying unit 52. The circulator is used to maintain a steady flow of gas in the direction of the arrow heads, thus preventing back diffusion of $D_2O$ steam to the space 40 outside the reactor vessel. A high pressure gas storage vessel 55 is connected to the shunt by means of a compressor 53 and throttling valve 54.

During the start-up spaces 39 and 40 communiate freely through the connection 41, and are therefore at the same pressure. As the reactor temperature and pressure are raised, the throttling valve 54 from the accumulator is operated in a pre-determined manner by the reactor temperature in such a way that the gas (e.g. $N_2$) fills most of the storage vessel 47. The reason for this is that it is desired to avoid diffusion of $N_2$ (in significant quantities) to the reactor vessel, and the diffusion of steam into the space 40. The storage volume 47 and shunt circuit provide adequate security against this happening.

Once full operating pressure and temperature are reached, the circulator 51 pumps a mixture of steam and gas through the drying unit 52, where water is removed from the gas.

In an interesting modification of the reactor of FIG. 2 the reactor tank has such dimensions as to come into contact with the insulating concrete blocks when the reactor reaches its full temperature and pressure. The insulation blocks then transmit the internal pressure from the reactor tank to the pre-stressed concrete vessel. When this condition has been reached there is no longer any need for pressure equalization by means of the gas. Therefore, in this embodiment the pressure equalization apparatus as disclosed in FIG. 2 is used during start-up and shut-down only. The circuit 41 also contains a shut-off valve 42 shunted by two pipes 43, 45 containing safety valves 44 and 46, one in either direction. When full operating pressure is reached, valve 42 is closed and the pressure in space 40 is allowed to fall to about 70% of the reactor pressure.

The most serious emergency in the embodiment now described would be a fast reduction in reactor pressure and temperature due to blowing of safety valves. As the temperature falls, the reactor vessel 36 contracts and is submitted to tensile stress. At the same time, however, the pressure difference available for submitting the vessel to this tensile stress falls and becomes zero when the reactor vessel reaches the pressure of space 40, i.e. about 70% of normal reactor pressure. Should the reactor pressure continue to fall after this point, then safety valve 44 opens and equalizes the pressure between the two spaces, admitting some $N_2$ gas to the reactor. This is not a serious matter for such a short emergency.

What is claimed is:

1. A nuclear reactor, comprising a comparatively thin-walled reactor tank, a water space in said reactor tank, a steam space in said reactor tank, a pressure-resistant vessel enclosing said reactor tank, a gas-filled space between the reactor tank and the pressure-resistant vessel, a communication between the steam space and the gas-filled space so as to equalize the pressures in said two spaces, means for withdrawing gas from said communication, means for removing any steam contained in said withdrawn gas, and means for supplying said dried gas to the gas-filled space.

2. A nuclear reactor as claimed in claim 1, in which the means for removing steam from the gas is a cooler in which the steam is removed by condensation.

3. A nuclear reactor as claimed in claim 1, in which the communication between the steam space and the gas-filled space is a pipe line containing a narrow passage, said narrow passage being shunted by a pipe line containing a circulator and a gas drier.

4. A method of operating a nuclear reactor of the type comprising a comparatively thin-walled reactor tank, a water space in said reactor tank, a steam space in said reactor tank, a pressure-resistant vessel enclosing said reactor tank, a gas-filled space between the reactor tank and the pressure-resistant vessel, and a communication between the steam space and the gas-filled space so as to equalize the pressures between said two spaces, which comprises withdrawing gas from said communication, drying the withdrawn gas so as to remove any steam from it, and supplying the dried gas to the gas-filled space.

5. A method as claimed in claim 4 for operating a nuclear reactor in which the gas-filled space is so narrow that the reactor tank comes into contact with the pressure-resistant vessel when the full normal pressure and temperature has been reached, which comprises keeping the communication between the steam space and the gas-filled space closed during normal operation at full pressure and temperature.

References Cited by the Examiner

UNITED STATES PATENTS

| 2,997,435 | 8/61 | Millar et al. | 176—59 |
| 2,999,059 | 9/61 | Treshow | 176—54 |
| 3,089,834 | 5/63 | Madsen | 176—59 |
| 3,098,023 | 7/63 | Schluderberg | 176—37 |

FOREIGN PATENTS 1,218,206  12/59  France.

CARL D. QUARFORTH, Primary Examiner.